United States Patent [19]

Nakaya et al.

[11] Patent Number: 5,046,122
[45] Date of Patent: Sep. 3, 1991

[54] IMAGE COMPRESSION DEVICE

[75] Inventors: Daisuke Nakaya; Hiroshi Horikawa, both of Kaisei, Japan

[73] Assignee: Fuji Photo Film Co., Ltd., Kanagawa, Japan

[21] Appl. No.: 458,463

[22] Filed: Dec. 28, 1989

[30] Foreign Application Priority Data

Dec. 28, 1988 [JP] Japan .................. 63-333837

[51] Int. Cl.$^5$ .................. G06K 9/48; H04N 1/40
[52] U.S. Cl. .................. 382/56; 358/261.1; 358/261.3; 341/87; 341/95
[58] Field of Search ............ 382/56; 358/261.1, 261.4, 358/261.3, 431; 341/87, 95

[56] References Cited

U.S. PATENT DOCUMENTS

| | | | |
|---|---|---|---|
| 3,624,637 | 11/1971 | Irwin | 341/95 |
| 3,902,008 | 8/1975 | Ogawa | 358/261.1 |
| 4,301,479 | 11/1981 | Fukinuki et al. | 358/431 |
| 4,626,829 | 12/1986 | Hauck | 341/87 |
| 4,757,552 | 7/1988 | Asano et al. | 358/261.3 |

Primary Examiner—Leo H. Boudreau
Assistant Examiner—Rohini Khanna
Attorney, Agent, or Firm—Sughrue, Mion, Zinn Macpeak & Seas

[57] ABSTRACT

This invention is an image compression device which includes a means to rearrange binary image data in a unit of pixel in accordance with a first conversion table, and a means to encode said rearranged data in accordance with a second conversion table, and which is characterized in that the second conversion table contains a data comprising a code which is added to a predetermined code used for the case where the same logical value continues in the rearranged data and which is based on the number of continuous pixels, a code having the same bit at the leading edge thereof as the leading bit of the predetermined code for the case where the same logical value continues up to the trailing end of the rearranged data, and a code having at its leading edge of a bit different from the leading bit of the predetermined code which is to be used for the data other than above. The above device according to this invention can compress any binary data including line images and dot images at high efficiency and high speed.

10 Claims, 9 Drawing Sheets

FIG. 6A

40 BITS, 10 LINES

| 0 | 1 | 2 | 3 | 4 | 5 | 6 | 7 | 8 | 9 |
|---|---|---|---|---|---|---|---|---|---|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

FIG. 6B

40 BITS, 10 LINES

| 0 | 2 | 4 | 6 | 8 | 10 | 12 | 14 | 16 | 18 |
|---|---|---|---|---|----|----|----|----|----|
| 1 | 3 | 5 | 7 | 9 | 11 | 13 | 15 | 17 | 19 |
| 38 | 36 | 34 | 32 | 30 | 28 | 26 | 24 | 22 | 20 |
| 39 | 37 | 35 | 33 | 31 | 29 | 27 | 25 | 23 | 21 |
| 40 | 42 | 44 | 46 | 48 | 50 | 52 | 54 | 56 | 58 |
| 41 | 43 | 45 | 47 | 49 | 51 | 53 | 55 | 57 | 59 |
| 78 | 76 | 74 | 72 | 70 | 68 | 66 | 64 | 62 | 60 |
| 79 | 77 | 75 | 73 | 71 | 69 | 67 | 65 | 63 | 61 |
| 80 | 82 | 84 | 86 | 88 | 90 | 92 | 94 | 96 | 98 |
| 81 | 83 | 85 | 87 | 89 | 91 | 93 | 95 | 97 | 99 |

| BIT PATTERN | CODE |
|---|---|
| 0 0 0 0 | 0 0 0 0 0 |
| 0 0 0 1 | 0 0 0 0 1 |
| 0 0 1 0 | 0 0 0 1 0 |
| 0 0 1 1 | 0 0 0 1 1 |
| 0 1 0 0 | 0 0 1 0 0 |
| 0 1 0 1 | 0 0 1 0 1 |
| 0 1 1 0 | 0 0 1 1 0 |
| 0 1 1 1 | 0 0 1 1 1 |
| 1 0 0 0 | 0 1 0 0 0 |
| 1 0 0 1 | 0 1 0 0 1 |
| 1 0 1 0 | 0 1 0 1 0 |
| 1 0 1 1 | 0 1 0 1 1 |
| 1 1 0 0 | 0 1 1 0 0 |
| 1 1 0 1 | 0 1 1 0 1 |
| 1 1 1 0 | 0 1 1 1 0 |
| 1 1 1 1 | 0 1 1 1 1 |
| CONTINUATION OF 00000000 | 1 0 0 + (VALUE OF BYTE COUNTER) |
| CONTINUATION OF 11111111 | 1 0 1 + (VALUE OF BYTE COUNTER) |
| WHITE END | 1 1 0 |
| BLACK END | 1 1 1 |

FIG. 7

| 0  | 1  | 2  | 3  | 4  | 5  | 6  | 7  | 8  | 9  |
|----|----|----|----|----|----|----|----|----|----|
| 19 | 18 | 17 | 16 | 15 | 14 | 13 | 12 | 11 | 10 |
| 20 | 21 | 22 | 23 | 24 | 25 | 26 | 27 | 28 | 29 |
| 39 | 38 | 37 | 36 | 35 | 34 | 33 | 32 | 31 | 30 |
| 40 | 41 | 42 | 43 | 44 | 45 | 46 | 47 | 48 | 49 |
| 59 | 58 | 57 | 56 | 55 | 54 | 53 | 52 | 51 | 50 |
| 60 | 61 | 62 | 63 | 64 | 65 | 66 | 67 | 68 | 69 |
| 79 | 78 | 77 | 76 | 75 | 74 | 73 | 72 | 71 | 70 |
| 80 | 81 | 82 | 83 | 84 | 85 | 86 | 87 | 88 | 89 |
| 99 | 98 | 97 | 96 | 95 | 94 | 93 | 92 | 91 | 90 |

FIG. 10A

| 4  | 5  | 14 | 15 | 24 | 25 | 34 | 35 | 44 | 45 |
|----|----|----|----|----|----|----|----|----|----|
| 3  | 6  | 13 | 16 | 23 | 26 | 33 | 36 | 43 | 46 |
| 2  | 7  | 12 | 17 | 22 | 27 | 32 | 37 | 42 | 47 |
| 1  | 8  | 11 | 18 | 21 | 28 | 31 | 38 | 41 | 48 |
| 0  | 9  | 10 | 19 | 20 | 29 | 30 | 39 | 40 | 49 |
| 99 | 90 | 89 | 80 | 79 | 70 | 69 | 60 | 59 | 50 |
| 98 | 91 | 88 | 81 | 78 | 71 | 68 | 61 | 58 | 51 |
| 97 | 92 | 87 | 82 | 77 | 72 | 67 | 62 | 57 | 52 |
| 96 | 93 | 86 | 83 | 76 | 73 | 66 | 63 | 56 | 53 |
| 95 | 94 | 85 | 84 | 75 | 74 | 65 | 64 | 55 | 54 |

FIG. 10B

| 0 | 19 | 20 | 39 | 40 | 59 | 60 | 79 | 80 | 99 |
|---|----|----|----|----|----|----|----|----|----|
| 1 | 18 | 21 | 38 | 41 | 58 | 61 | 78 | 81 | 98 |
| 2 | 17 | 22 | 37 | 42 | 57 | 62 | 77 | 82 | 97 |
| 3 | 16 | 23 | 36 | 43 | 56 | 63 | 76 | 83 | 96 |
| 4 | 15 | 24 | 35 | 44 | 55 | 64 | 75 | 84 | 95 |
| 5 | 14 | 25 | 34 | 45 | 54 | 65 | 74 | 85 | 94 |
| 6 | 13 | 26 | 33 | 46 | 53 | 66 | 73 | 86 | 93 |
| 7 | 12 | 27 | 32 | 47 | 52 | 67 | 72 | 87 | 92 |
| 8 | 11 | 28 | 31 | 48 | 51 | 68 | 71 | 88 | 91 |
| 9 | 10 | 29 | 30 | 49 | 50 | 69 | 70 | 89 | 90 |

FIG. 10C

IMAGE COMPRESSION DEVICE

BACKGROUND OF THE INVENTION

This invention relates to an image compression device which compresses binary image data at high efficiency and high speed.

Since image data tend to become voluminous, it is extremely inefficient to store or transfer them as they are. In order to transmit data of halftone images or newspaper images effectively by a facsimile, there has been used a technology of transmission for pseudo halftone images which represent halftones with the binary data. There have been known as the prior art Modified Huffman Coding method (MH-Method) and Modified-READ method (MR-Method).

Since the binary image data are compressed in a direction of a main scanning in the image compression device using the aforementioned MH-Method or MR-Method, the compression efficiency is low for processing the binary image data having statistical characteristics (such as resolution) that are different between the main and the auxiliary scanning directions. Since the device processed data in the unit of one bit, the speed of encoding is slow, and hence, the conventional compression device cannot realize the compression at high speed.

SUMMARY OF THE INVENTION

This invention was conceived to eliminate such defects encountered in the prior art and aims to provide an image compression device which can compress any binary data including line images and dot images at high efficiency and high speed.

According to one aspect of this invention, for achieving the objects described above, there is provided an image compression device which includes a means to rearrange binary image data in a unit of pixel in accordance with a first conversion table, and a means to encode the rearranged data in accordance with a second conversion table, and which is characterized in that the second conversion table contains a data comprising a code which is added to a predetermined code used for the case where the same logical value continues in the rearranged data and which is based on the number of continuous pixels, a code having the same bit at the leading edge thereof as the leading bit of the predetermined code for the case where the same logical value continues up to the trailing end of said rearranged data, and a code having at its leading edge a bit different from the leading bit of the predetermined code which is to be used for data other than above plural data.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a chart to show an example of a sub-block for binary image data;

FIGS. 5, 6A, 6B, 10A, 10B and 10C show examples of data set in a conversion table in the rearranging unit shown in FIG. 2;

FIG. 7 is a chart to show an example of the data set in the conversion table of the encoding unit shown in FIG. 3.

DESCRIPTION OF THE PREFERRED EMBODIMENTS

Figure 1:
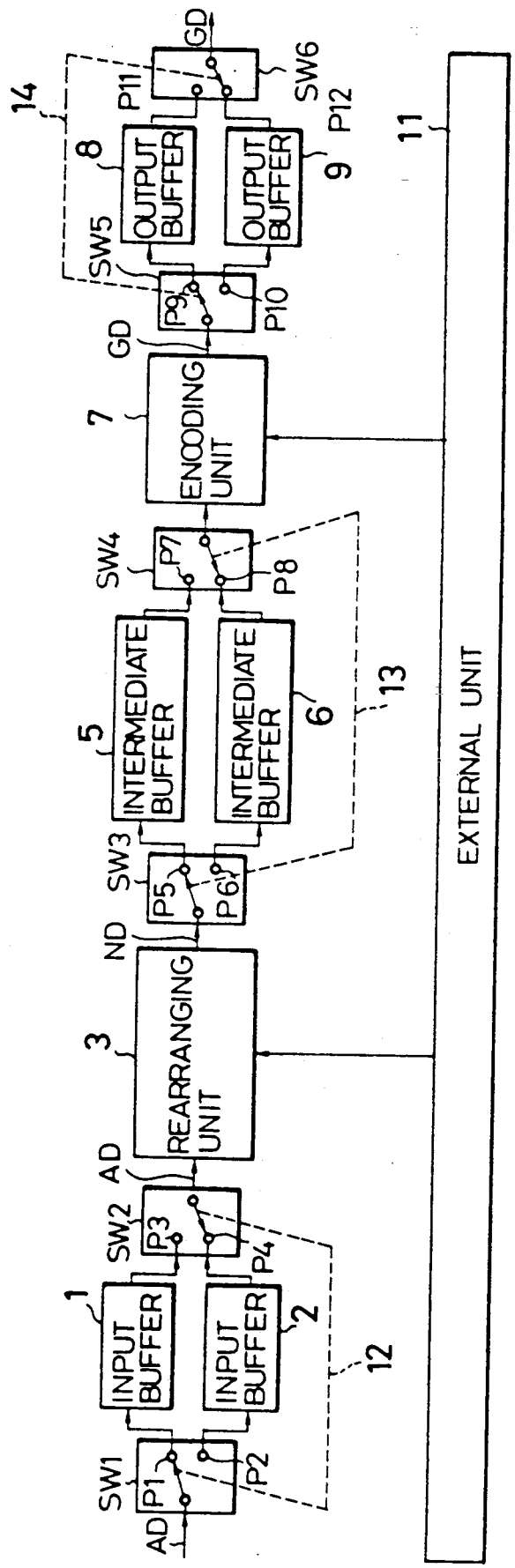
FIG. 1 is a block diagram to show the structure of an embodiment of the image compression device according to this invention.

FIG. 1 is a block diagram to show the structure of an embodiment of the image compression device according to this invention.

The image compression device essentially comprises a rearranging unit 3, an encoding unit 7, and an external unit 11 such as CPU which controls respective units. The input binary image data AD are compressed in image by the rearranging unit 3 and the encoding unit 7.

Input buffers 1 and 2 are provided at upstream positions of the rearranging unit 3 in order to temporarily store the binary image data AD. Switches SW1 and SW2 are also provided at upstream positions of the rearranging device 3 so that the input binary image data AD may be written in either one of the input buffers 1 and 2 by switching a contact P1 or P2 of the switch SW1 or SW2. When the writing of the binary image data AD is completed, a binary image data AD is inputted to the rearranging device 3 by switching a contact P3 or P4 of the switch SW2 at a predetermined timing. The contacts P2 through P4 of the switches SW1 and SW2 form a switching means 12. At upstream positions of the encoding unit 7 are provided intermediate buffers 5 and 6 which temporarily store rearranged data.

Also provided is a switching means which comprises switches SW3 and SW4 for switching a contact P5 or P6 of the switch SW3 at a predetermined timing in order to write in the rearranged data ND, and for switching contacts P7 or P8 of the switch SW4 in order to input the data ND at the encoding unit 7 when the writing is completed. Downstream of the encoding unit 7 are provided output buffers 8 and 9 for temporarily storing compressed image data GD and a switching means 14 which comprises switches SW5 and SW6 for switching a contact P9 or P10 of the switch SW5 and for switching a contact P11 or P12 of the switch SW6 so that the compressed image data GD may be read out.

Figure 2:
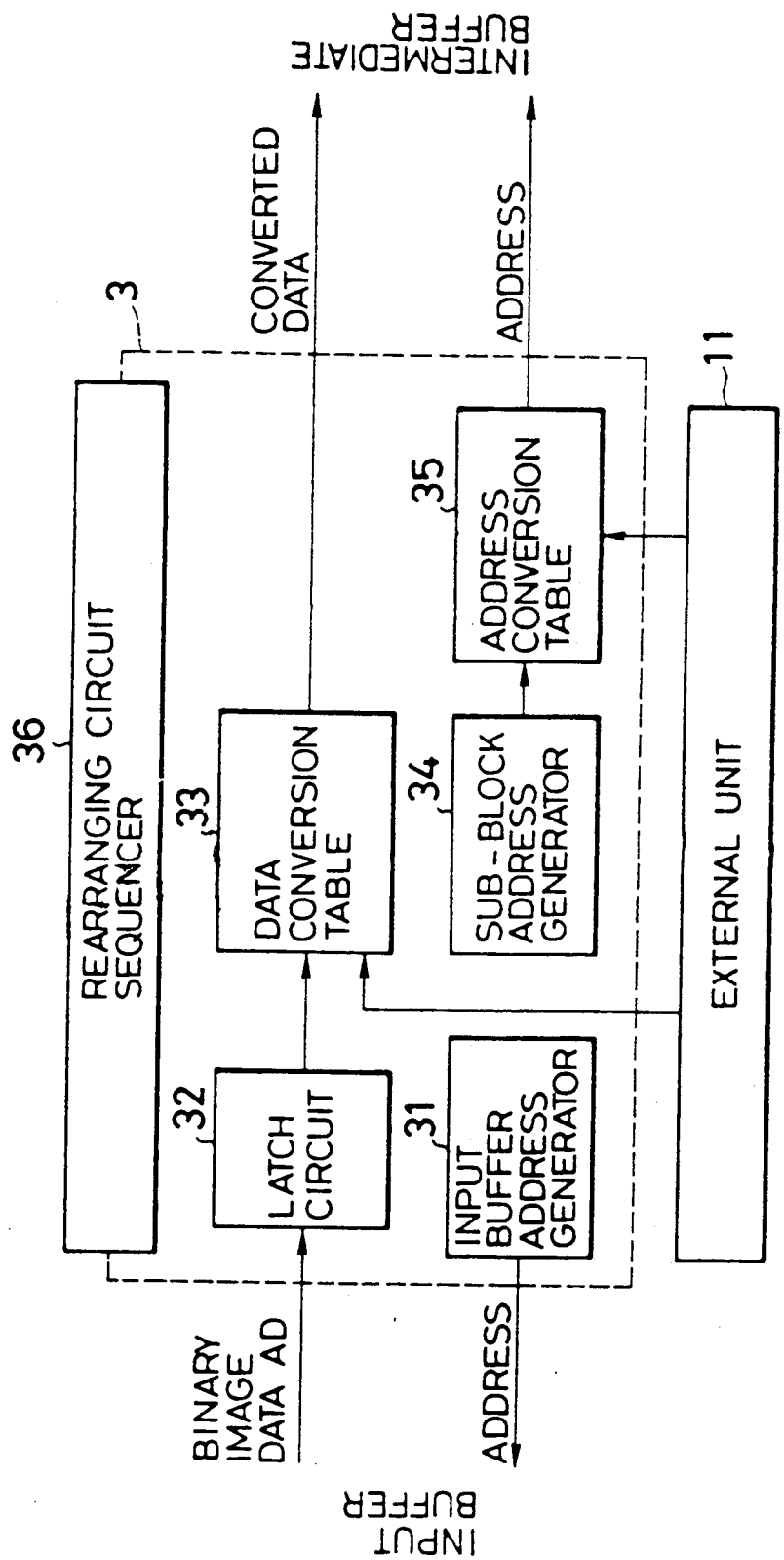
FIGS. 2 and 3 show essential portions of the embodiment, namely, a rearranging unit and an encoding unit, in block diagrams respectively.
Figures 4, 5:
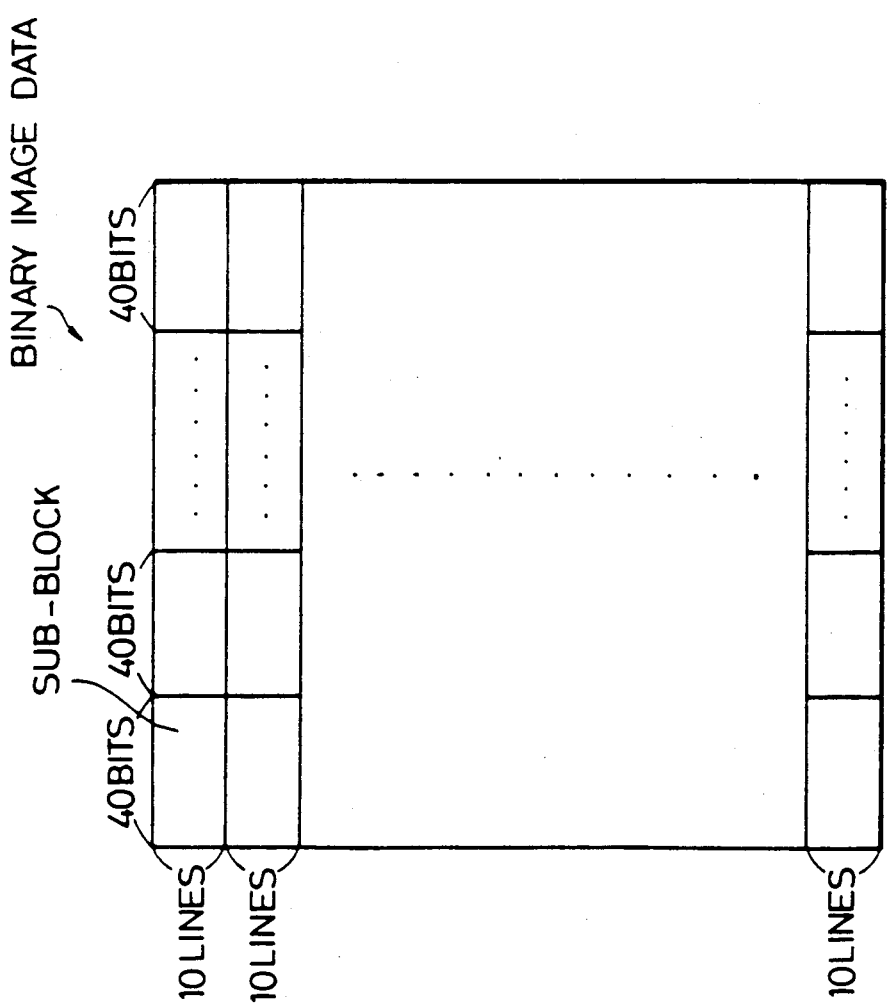

FIG. 2 is a block diagram to show an embodiment of the rearranging unit 3 wherein the binary image data AD are read out for one sub-block from either the input buffer 1 or 2 according to an address outputted from an input buffer address generator 31. A sub-block is obtained by partitioning the binary image data by a predetermined number of bits; for instance, the area defined by 40 bits/line × 10 lines shown in FIG. 4 is a sub-block. The binary image data is read out in units of a sub-block, and the read out binary image data is latched by a latch circuit 32. The binary image data of 8 bits thus latched is converted and rearranged into data of 4 bits in accordance with a data conversion table 33 set in advance by the external unit 11, and written in either at the intermediate buffer 5 or 6. An address (address in the order of normal scanning) along the threshold matrix which is outputted from a sub-block address generator 34 is converted in accordance with an address conversion table 35 set by the external unit 11 in advance to be used as the address for rearranging and writing in the converted data either at the intermediate buffer 5 or 6. The operations of these units are controlled by a rearranging circuit sequencer 36.

Figure 3:
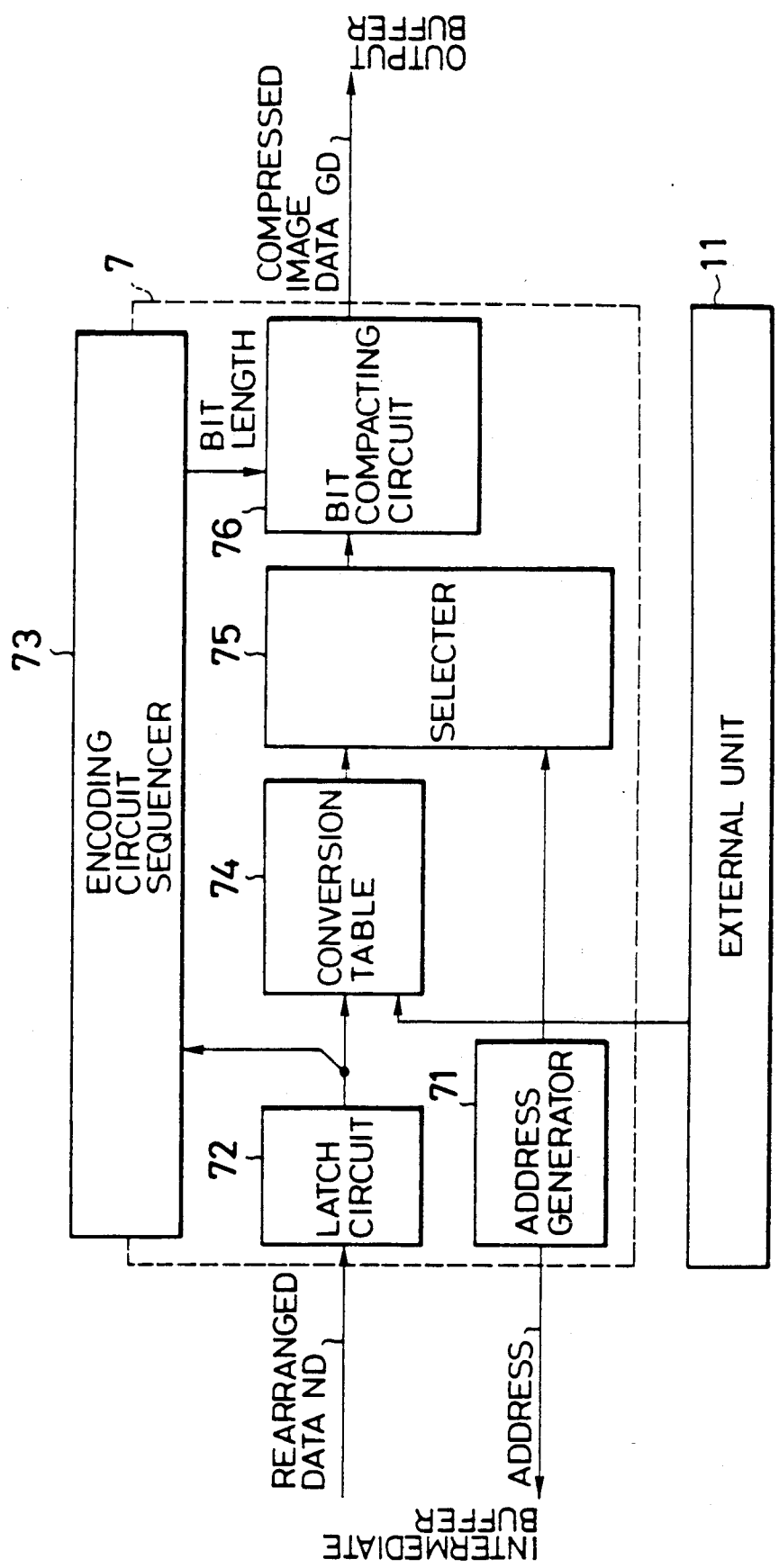

FIG. 3 is a block diagram to show an embodiment of the encoding unit 7 wherein the rearranged data ND is read out in units of 4 bits from intermediate buffer 5 or 6 in accordance with an address outputted from an address generator 71, and latched by a latch circuit 72. The rearranged data ND thus latched are converted into 8 bits by a rearranging circuit sequencer 73 for the encoding unit 7, and judged. The address in the address generator 71 is either increased or decreased based on the result of judgement. The rearranged and latched data ND encoded in accordance with a conversion table 74 set in advance by the external unit 11, and also encoded in accordance with the address from the address generator 71 which have been selected by a selecter 75. The encoded data is compressed by a bit compacting circuit 76 in the unit of the bit length generated from the rearranging circuit sequencer 73 for the encoder. When a data of 8 bits is obtained, the data is written in the output buffer 8 or 9 as a compressed image data GD. The rearranging circuit sequencer 73 contains microprograms for each type of binary image data, and encoding to each type may be conducted using the same hardware.

In the structure mentioned above, for example, data for line images or dot images are set by the external unit 11 in the data conversion table 33 of the rearranging unit 3. as shown in FIG. 5. Bits of the binary image data AD are rearranged irrespective of the order of the digits thereof in the data for dot images (for example, the binary image data of "1010" will be expressed as "0011") while in the data for line images, bits of the binary image data AD are arranged as they are.

The address conversion table 35 is written with data, for example as shown in FIG. 6A or 6B by the external unit 11. The data which have been converted by the data conversion table 33 are rearranged in the unit of bytes into the rearranged data ND, in the order of the serial number (0, 1, 2, . . . , 99) of the address which has been converted by the address conversion table 35.

The conversion table 74 of the encoding unit 7 is written with data, for example as shown in FIG. 7, by the external unit 11. Rearranged data of 4 bits are encoded by a first code of 5 bits comprising the rearranged data of 4 bits plus "0" at the leading edge. If "00000000" or "11111111" continues, they are encoded by writing in the value of a byte counter as a second code immediately after the series of "00000000" or "11111111" ends in a n bits (for instance 6). A series of "00000000" or "11111111" is also encoded as "100" or "101" as a third code which is added to the second code, thus creating a combined code. If all the remaining pixels are "0" or "1", they are encoded by an end code "110" or "111" as a fourth code.

Figure 8:
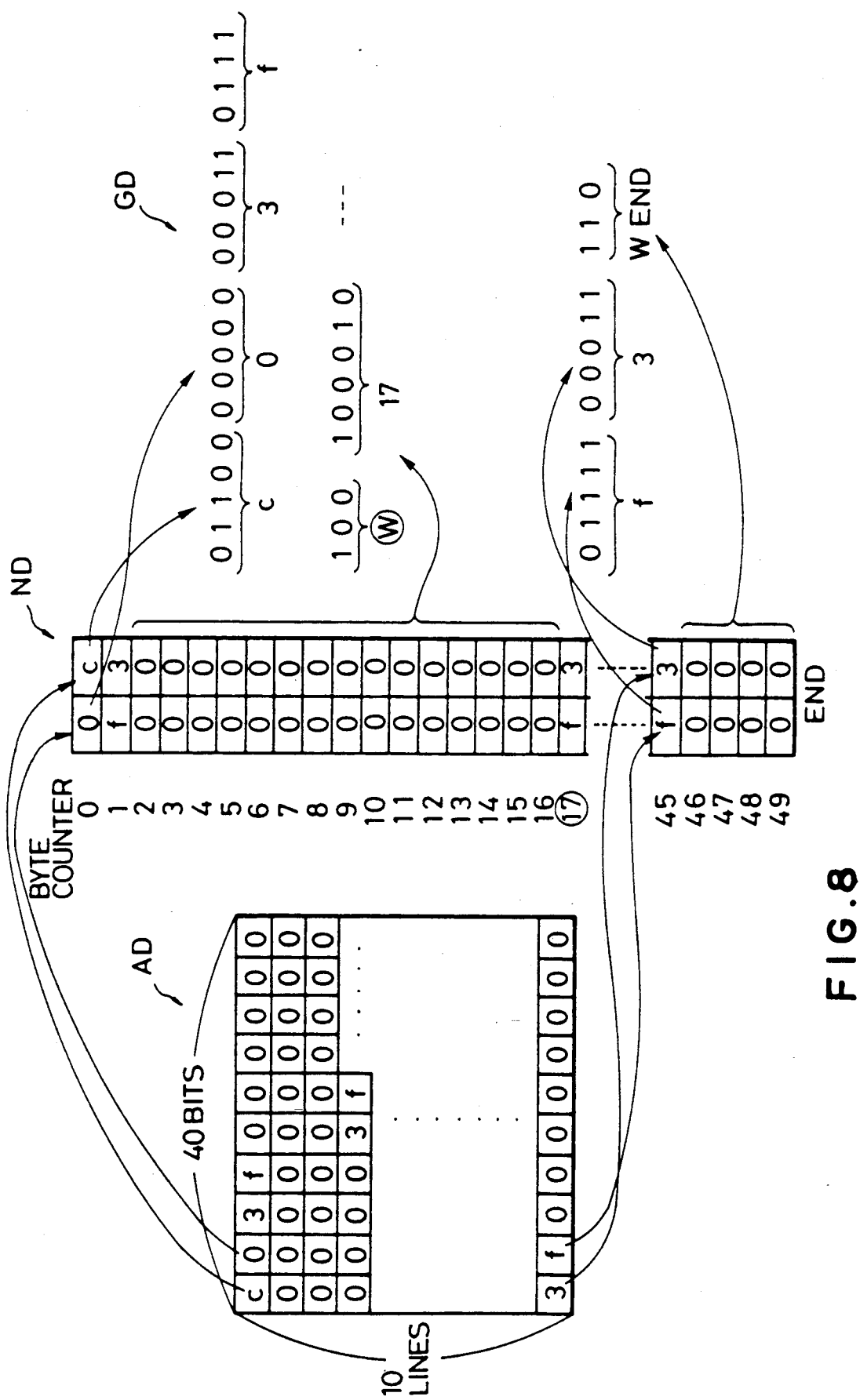
FIGS. 8 and 9 show specific examples of images compacted by this invention device.
Figure 9:
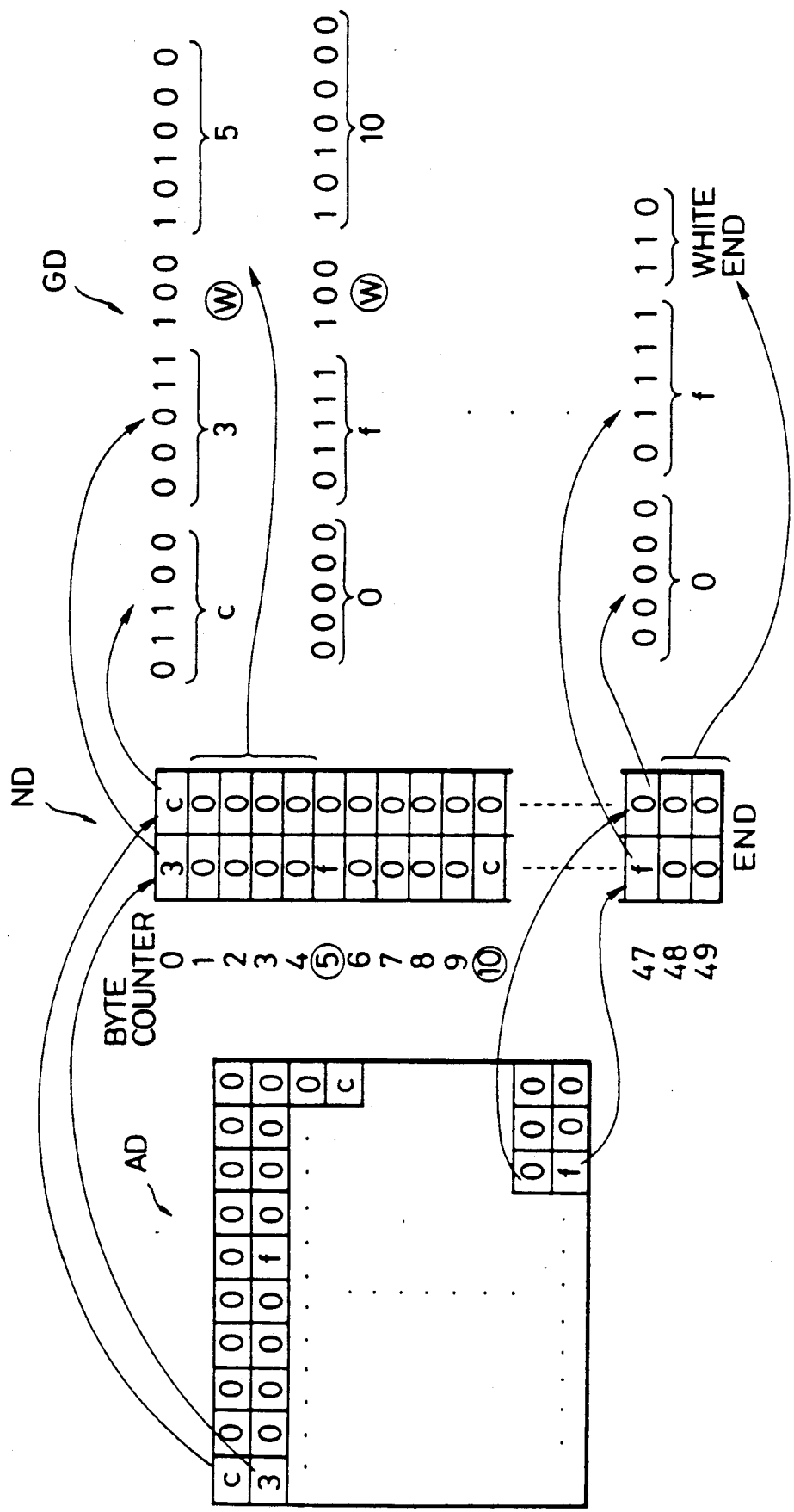

FIGS. 8 and 9 show specific examples of rearrangement and encoding described above.

FIG. 8 shows a case wherein the data shown in FIG. 6A is used while FIG. 9 a case wherein the data shown in FIG. 6B are used. The binary image data AD are rearranged in the unit of bytes in the order of the serial number shown in FIG. 6A or 6B to obtain the data ND, and encoded in accordance with the data shown in FIG. 7, and compressed into the image data GD. The rearrangement by the data shown in FIG. 6A is a rearrangement in the ordinary scanning direction, but at the final stage, the image data can be compressed by 50%. The rearrangement by the data shown in FIG. 6B positions adjacent pixels side by side with due consideration of the continuity of images. In this case, image data can be compressed at the final stage to ca. 30%. The data are not limited to those shown in FIG. 6B but may be those shown in FIGS. 10A through 10C.

As described in the foregoing statement, since the image compression device according to this invention rearranges data with due consideration of the continuity of images according to the type of either line or dot image, and encodes them in the unit of plural bits, the device is applicable to any type of binary image data such as line or dot image for efficient data compression at high speed.

It should be understood that many modifications and adaptations of the invention will become apparent to those skilled in the art and it is intended to encompass such obvious modifications and changes in the scope of the claims appended hereto.

What is claimed is:

1. An image compression device for compressing binary image data, said binary image data having corresponding address information and being formed by data received from a plurality of pixels, wherein each bit of said binary image data corresponds to an individual one of said pixels, comprising:

means to rearrange said binary image data in accordance with at least a first conversion table; and means to encode said rearranged data in accordance with a second conversion table, wherein said second conversion table contains data comprising a first code, said first code being predetermined for each possible logical bit value; a second code, said second code being determined according to a count of an uninterrupted series of the same logical bit value; and a third code, said third code being determined in accordance with a unit of said rearranged data having an uninterrupted series of the same logical bit value, where the leading edge bit of said third code differs from the leading edge bit of said first code; and wherein upon the occurrence of a first situation, said first situation being when the same logical bit value continues in an uninterrupted series in said rearranged data said encoding means adds in series said second code to said third code thus creating a combined code, said encoding means encodes said combined code in place of said uninterrupted series, and upon the occurrence of a second situation, said second situation being when said first situation does not occur, said encoding means encodes said first code.

2. An image compression device as claimed in claim 1, wherein said image compression device processes said binary image data in units of sub-blocks, said sub-blocks being formed by a predetermined number bits of said binary image data.

3. An image compression device as claimed in claim 2, wherein said data contained in said second conversion table further comprises a predetermined fourth code, said fourth code being predetermined for each possible logical bit value and the leading edge bit of said fourth code being different from the leading edge bit of said first code; and wherein when said first situation occurs at the trailing end of said sub-block, said encoding means encodes said fourth code in place of said uninterrupted series.

4. An image compression device as claimed in claim 1, wherein said third code comprises a single bit, said single bit being different than the leading edge bit of said first code; and wherein said encoding means adds said third code to the leading edge of said unit of said rearranged data not having an uninterrupted series.

5. An image compression device as claimed in claim 1, wherein said first conversion table contains data which position adjacent pixels of said binary image data side by side.

6. An image compression device as claimed in claim 1, wherein said rearrangement means comprises an address generator which outputs a first address for reading out one said sub-block of said binary image data, a sub-block address generator which outputs a second address along a threshold matrix, an address conversion table which outputs address data for the output data from said first conversion table in accordance with the data from said second address and from an external unit, and a rearrangement circuit sequencer which controls said respective means.

7. An image compression device as claimed in claim 6, wherein said sub-block is in the unit of 4 bits.

8. An image compression device as claimed in claim 1, wherein intermediate buffers are provided between said rearrangement means and said encoding means.

9. An image compression device as claimed in claim 8, wherein said encoding means comprises an address generator which outputs an address for reading out the data from said intermediate buffers, an encoding circuit sequencer which converts in bit the data read out from said intermediate buffers and controls the data as a whole, a selector which selectively outputs the output from said second conversion table and the address from said address generator, and a bit compaction circuit which compresses the data outputted from said selector in a unit of bit length generated from the encoding circuit sequencer.

10. An image compression device as claimed in claim 9, wherein said encoding circuit contains microprograms, each of said microprograms corresponding to a different type of binary image data.

* * * * *